US007222991B2

(12) United States Patent
Becker

(10) Patent No.: US 7,222,991 B2
(45) Date of Patent: May 29, 2007

(54) LIGHT SOURCE FOR PRECISION WORK

(75) Inventor: Steve Becker, Jarplund-Weding (DE)

(73) Assignee: Sigma Dental Systems Emasdi GmbH, Jarplund-Weding (DE)

(*) Notice: Subject to any disclaimer, the term of this patent is extended or adjusted under 35 U.S.C. 154(b) by 31 days.

(21) Appl. No.: 11/028,442

(22) Filed: Dec. 31, 2004

(65) Prior Publication Data

US 2006/0023458 A1 Feb. 2, 2006

(30) Foreign Application Priority Data

Jul. 30, 2004 (EP) ................................ 04018179

(51) Int. Cl.
*F21L 4/04* (2006.01)
*G02B 27/02* (2006.01)

(52) U.S. Cl. ..................... 362/268; 362/109; 362/202; 359/800

(58) Field of Classification Search ................ 362/109, 362/268, 326, 800, 202; 359/800, 821
See application file for complete search history.

(56) References Cited

U.S. PATENT DOCUMENTS 5,042,048 A * 8/1991 Meyer ........................ 372/108
5,173,810 A 12/1992 Yamakawa .................. 359/819
6,402,347 B1 6/2002 Maas et al. ................. 362/294
6,478,453 B2 11/2002 Lammers et al. ........... 362/294

FOREIGN PATENT DOCUMENTS

DE 203 10 313 U1 1/2004
WO WO 00/24062 4/2000

* cited by examiner

*Primary Examiner*—Ali Alavi
(74) *Attorney, Agent, or Firm*—Townsend and Townsend and Crew LLP

(57) ABSTRACT

The invention provides a light source (1, 200), especially a portable light source (1, 200) used to illuminate a medical or precision mechanical working area, with a casing (2), with a light diode (4) held by the casing (2), with a primary focusing lens (6, 6*a*) held by the casing (2) in the direction of emissions (2*a*) from the light emitting diode (4), with a secondary focusing lens (8) held by the casing (2) positioned behind the primary focusing lens (6, 6*a*) in the direction of emissions (2*a*) from the light emitting diode (4), and that has a largely cylindrical recess (10), with the characteristic that a floor (12) of the recess (10) facing the primary focusing lens (6, 6*a*) is curved in the direction of the primary focusing lens (6, 6*a*).

16 Claims, 5 Drawing Sheets

LIGHT SOURCE FOR PRECISION WORK

RELATED APPLICATIONS

This application claims the benefit of priority to European Patent Application No. 04 018179.4 filed Jul. 30, 2004 entitled "LEUCHTKÖRPER" for inventor Steve Becker, and is incorporated herein by reference in its entirety.

TECHNICAL FIELD OF THE INVENTION

The present invention relates generally to light sources, and more particularly, a portable light source operable to illuminate a precision work area such as a medical or dental treatment field, or precision mechanical working area, such as those used in watch making.

BACKGROUND OF THE INVENTION

Specialized light sources are currently available for precision work. For example, lamps have been developed that are compact and lightweight such as those used or mounted on a user's head or helmet. In the medical field, such lamps are used during operations or other procedures in addition to operating theater lamps. This second light source provides increased illumination of the precision work area. The intensity of the light provided to the precision work area is extremely important.

Previously, two types of lamps were primarily used. First, optical fiber technology has been used to provide illumination to these precision work areas. These lamps may provide relatively intense localized light. However, a disadvantage associated with optical fiber technology is that in order to provide a relatively intense field of illumination, the lamp itself may be a heavy unit that is too cumbersome to be carried by the user. Additionally, the cables and optical fibers associated with this lamp restrict the freedom of movement of the user.

Another solution essentially provides a portable flashlight held in place, for example, on the head, by means of a strap. Such a lamp is equipped with a light bulb and, when powered by batteries, provides a relatively easy and portable solution with which to provide illumination to a precision work area. The disadvantage associated with this solution is that within normal light bulbs, 80 percent of the energy is transformed into heat while only 20 percent of the energy actually illuminates the work area. Therefore, such a solution typically uses oversized batteries or provides less intense light than expected to illuminate the precision work area or medical treatment area. In order to further increase the illumination in the work area, such conventional lights often become too hot causing discomfort for the user as well as negatively impacting the work area. This is because the increase in light intensity not only increases the visible light but also increases the 80 percent of the lamp's output that is converted to heat.

Another solution to increasing the light intensity involves the use of halogen lamps, however, this type of lamp also becomes too hot for use in a treatment field and can negatively impact the precision workspace, as well as causing discomfort to the user.

SUMMARY OF THE INVENTION

The present invention provides a portable light source that substantially addresses the above-identified needs and others. More specifically, the present invention provides an improved portable light source. This light source is operable to illuminate a medical or precision mechanical working area. The light source has a housing or casing, a light emitting diode (LED) diode, a primary focusing lens and a secondary focusing lens. The LED, primary focusing lens, and secondary focusing lens are arranged within the casing and oriented along an optional axis of the light emitted from the LED. The secondary focusing lens is positioned behind the primary focusing lens along the optical axis. The primary focusing lens mounts within a cylindrical recess within the casing. This cylindrical recess has a curved surface that is curved toward the primary focusing lens.

The use of a LED to provide the illumination allows a lighter and more efficient portable light source than was previously possible with fiber optics or conventional light bulbs. Additionally, the low energy consumption and a low thermal output provides a significant advantage over previous solutions.

To simultaneously maximize the light intensity in the precision work area, a secondary focusing lens is provided before the primary focusing lens wherein both the secondary focusing lens and primary focusing lens are aligned along the optical axis of the light emitted by the LED. The ratio of the secondary focusing lens's, radius of curvature, and that of the primary focusing lens will be discussed later in further detail. With the combination of the secondary focusing lens and primary focusing lens, it is possible to obtain a light intensity between about 19,000 LUX and 50,000 LUX at a distance of about 25 centimeters to 50 centimeters (cm) from the portable light source.

Furthermore, the use of the LED provides a significant advantage in that the maximum temperature experience is typically about 55° C. or less. This is significantly less than the heat load produced using conventional bulbs. This also increases the overall efficiency of the portable light source over previously available systems. The LED is operable to transform about 80% of the energy into light while the remainder is converted to thermal energy. As the LED more efficiently produces light, batteries or other portable power supplies' useful life are increased while maintaining the same light intensity. Therefore, the use of this portable light source can be extended by the lightweight efficient portable light source of the present invention.

The present invention provides another advantage in that LEDs previously have only been able to produce a light intensity of about 10,000 Lux. Therefore, the light intensity at the work area is typically less than 10,000 Lux due to the separation between the light source and the work area. Using the primary and secondary focusing lenses, the light intensity in the work area may be increased. Thus, one embodiment provides a light intensity at a distance between about 25 cm and 50 cm in excess of 10,000 Lux. For example, light intensities between 30,000 and 50,000 Lux have been provided using this light source.

The primary and secondary focusing lenses are also able to focus the light emitted by the LED in a narrower cone. Thus, one embodiment of the present invention is able to provide a focused intense cone of light with a diameter of about 3 centimeters to about 8 centimeters, at a distance between 25 centimeters and about 50 centimeters from the light source.

In one embodiment, the housing or casing subtends an angle $\alpha$ between about 40° and 80°. Additional embodiments may further limit the angle the opening subtends from about 50° to about 70°, or further yet, from 58° to 64°.

An air gap may separate the outer surfaces of the secondary focusing lens and the housing to help optimize the light intensity transmitted to the precision work area. This air gap may be between approximately one degree and two degrees.

Other features and advantages of the present invention will become apparent from the following detailed description of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
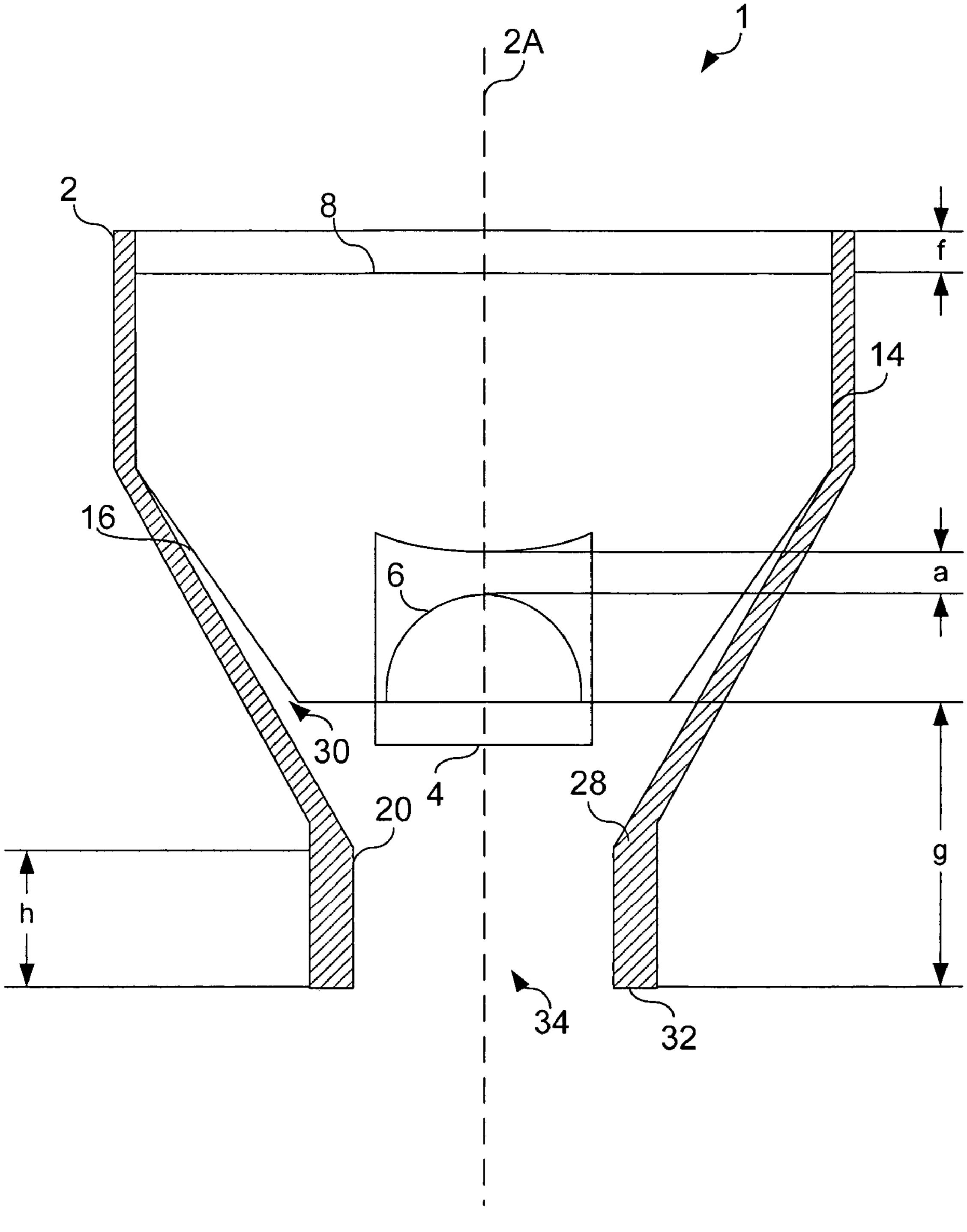
FIG. 1 shows a cross-section of a portable light source in accordance with an embodiment of the present invention.

FIG. 1 shows an embodiment of a portable light source or lamp 1 operable to illuminate a medical treatment or precision work area. The cross section of lamp 1 includes housing or casing 2 that is symmetrical about axis 2A. Housing or casing 2 in three dimensions has a conical or funnel shaped form. LED 4, primary focusing lens 6, and secondary focusing lens 8 are arranged within housing 2. LED 4 may be powered by a portable energy source (not shown) such as a battery coupled to LED 4. Primary focusing lens 6 optically couples to LED 4 and is aligned along optical axis 2A of LED 4. Primary focusing lens 6 as depicted has a hemispherical profile which corresponds essentially to a Lambert-curve. This primary focusing lens is made of a transparent material such as glass, Plexiglas, or other like transparent or optically conductive material known to those skilled in the art.

Primary focusing lens 6 in one embodiment is a hemispherical lens having a radius of curvature of 2.5 millimeters (mm). The flat portion of the hemisphere optically couples to the LED to receive light emitted from LED 4. Beneath the hemispherical portion of primary focusing lens 6, a cylindrical portion 6A of the primary focusing lens is provided and optically couples the primary focusing lens with LED 4. The cylindrical portion 6A of primary focusing lens 6 may be made of the same material as the hemispherical portion of lens 6. In this embodiment, section 6A has a diameter of 5 millimeters that matches the 2.5 millimeter radius of curvature of the hemispherical portion. LED 4 may be a single LED or an array of LEDs.

Figure 3:
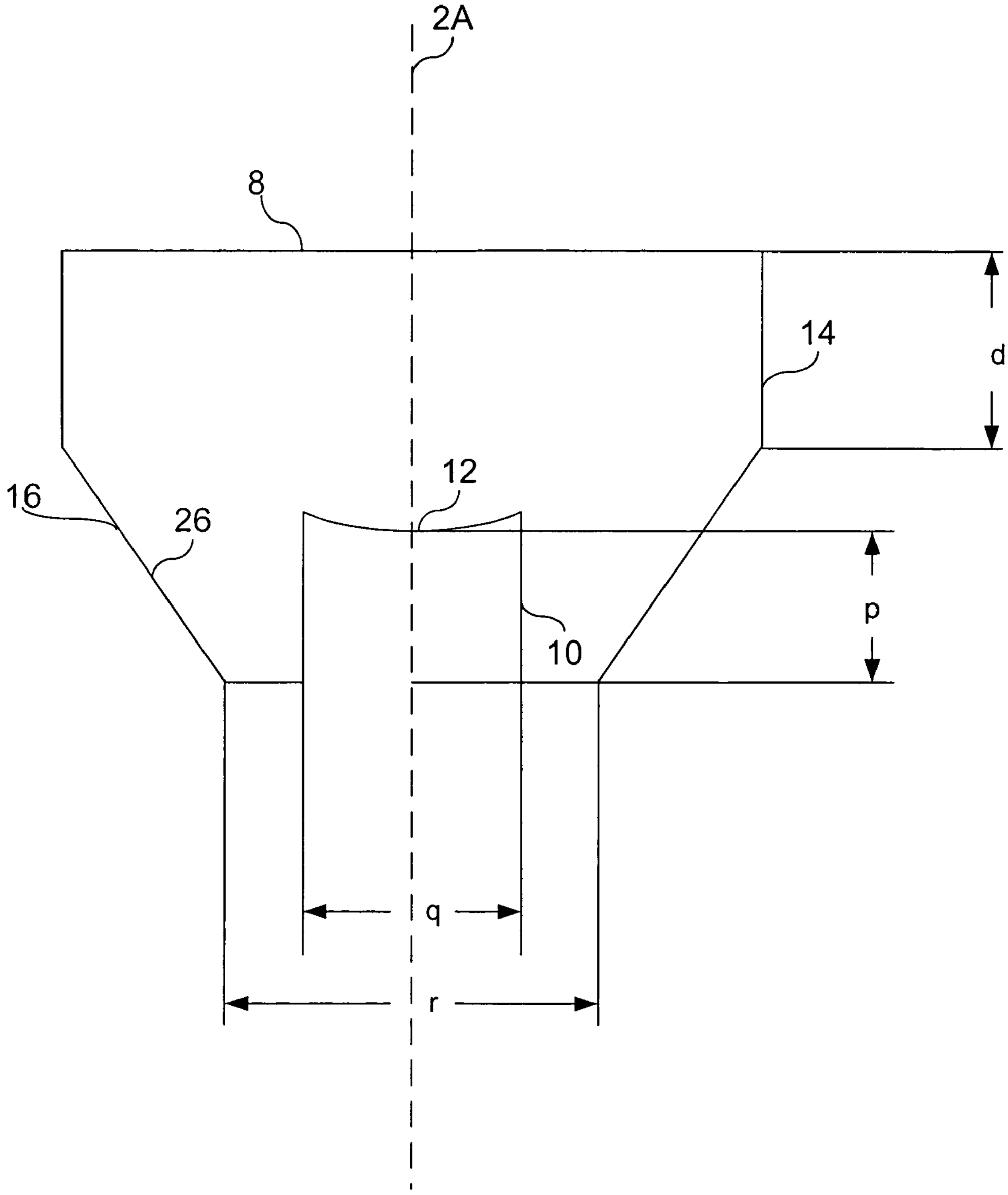
FIG. 3 depicts the secondary focusing lens of the portable light source of FIG. 1.

Secondary focusing lens 8 is provided within lamp or casing 2. Secondary focusing lens 8 may be made of a PMMA crystal, glass, or other suitable transparent or optically conductive material known to those having skill in the art. A cylindrical recess 10 in secondary focusing lens 8 is aligned about the optical axis 2A of LED 4 and primary lens 6. Recess 10 has a depth p. As shown in FIG. 3, primary focusing lens 6 may be completely located within recess 10. In other embodiments, primary focusing lens 6 may only be partially located within recess 10. The upper surface 12 of recess 10 is a curved optical surface aligned about optical axis 2A. Optical surface 12 is a curved lens directed towards the hemispherical portion of lens 6. The ratio of the radius of curvature of the hemispherical portion of primary lens 6 and the radius of curvature of curve surface 12 are such that the radius of curvature of surface 12 is substantially larger than that of the hemispherical portion of primary focusing lens 6. In one embodiment, the radius of curvature of curved surface 12 is at least twice that of the radius of curvature of the primary focusing lens. In other embodiments, this ratio may be 3, 3.5, or even greater. For example, in one embodiment the radius of curvature of curve surface 12 is about 9 millimeters and is therefore substantially larger than the 2.5-millimeter radius of curvature of the hemispherical portion of primary focusing lens 6.

A gap separates the top of the hemispherical portion of the primary focusing lens 6 and curved surface 12. This gap may in fact be an air gap and have a separation distance in one embodiment of 1.8 millimeters. Other embodiments may have a gap A between about 1 and 3 millimeters. For example, one particular embodiment has a gap between about 1.8 to 2.3 millimeters.

Figure 2:
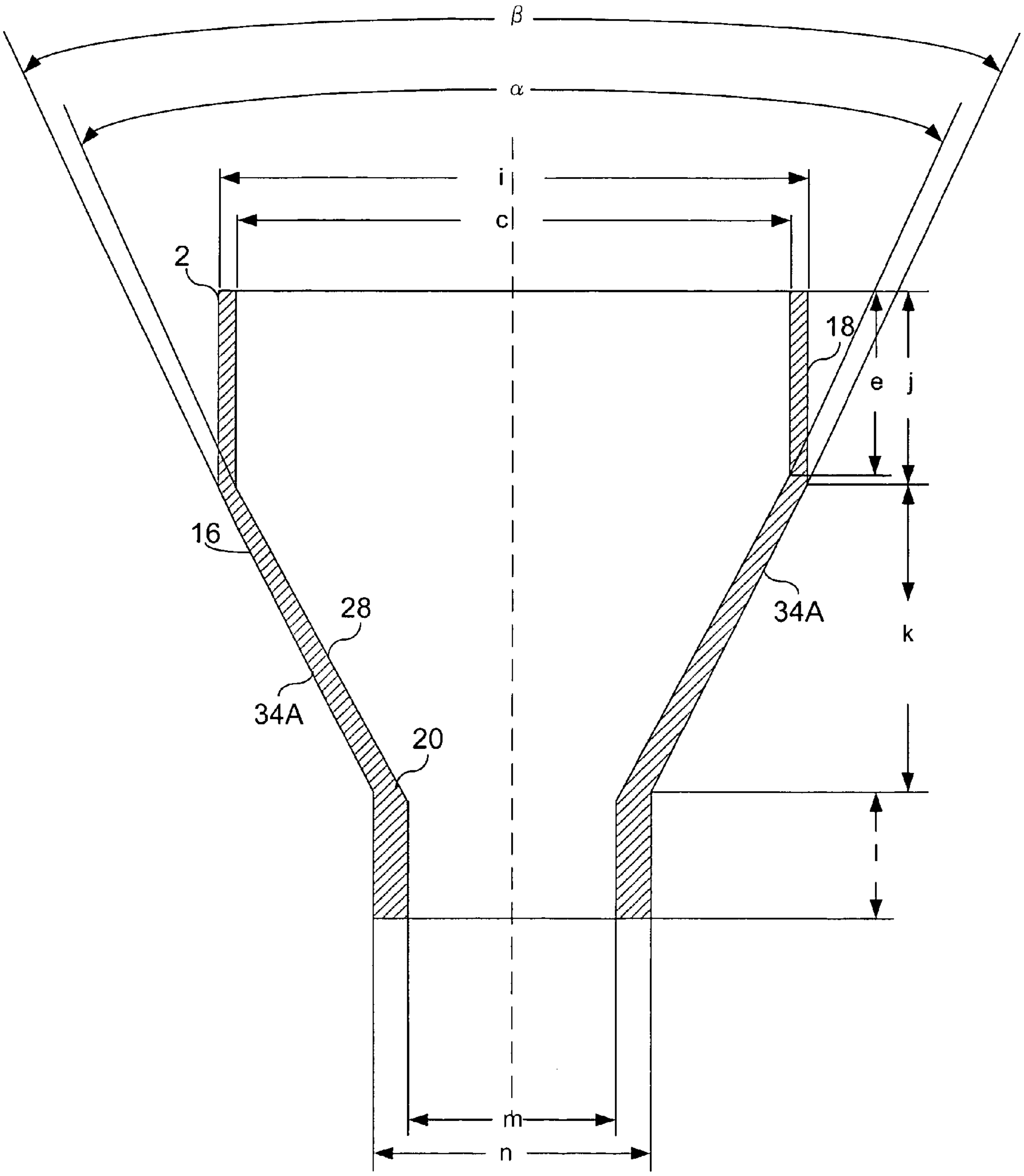
FIG. 2 provides an enlarged representation of the housing of FIG. 1.

FIG. 2 provides an enlarged representation of housing 2. Inner walls 20 of section 28 subtend an opening angle $\alpha$. Outer walls 34 of housing 2 subtend a larger angle $\beta$. The wall strength of housing 2 will also determine the inner diameter c and outer diameter i of the housing. These outer diameters correspond to the upper cylindrical portion 18 of housing 2.

FIG. 3 provides a cross-section of secondary focusing lens 8. Upper section 14 of secondary lens 8 is a cylindrical section that in this embodiment has a height d and diameter b. Diameter b may match the interior diameter C of the housing as shown in FIG. 2. Additionally, the cylindrical section 14 may have a height d that matches the height e of the cylindrical upper portion 18 of the housing as shown in FIG. 2. In one particular embodiment, the interior diameter c and cylindrical diameter b of secondary focusing lens is 26 millimeters. Other embodiments may have diameters between about 24 millimeters and 35 millimeters.

Secondary focusing lens 8 may also have a cylindrical portion having the height d that matches the height e of cylindrical portion 18 of housing 2 which, in one embodiment, is 7.7 millimeters. Alternatively, these heights may differ. For example d may be less than e. In one embodiment the height of cylindrical portion 18 is 7.7 millimeters while the height of cylindrical portion 14 of secondary focusing lens 8 has a length d of 5.9 millimeters. The relationship of these lengths can be varied as desired. The greater length of the cylindrical portion 18 of housing 2 may further protect the secondary optical lens. Frustum section 16 of secondary focusing lens 8 has a base which may optically couple or otherwise rest on LED 4. Between the frustum section 16 of secondary lens 8 and conical section 28 of housing 2, air gap 30 exists. This air gap tapers from a maximum delta between secondary lens 8 and housing 2 due to a difference in the angle of inclination of section 28 of the housing and section 16 of the secondary focusing lens.

LED 4 may have an adjustable height within recess 10. This adjustable height may affect the optical coupling between primary focusing lens 6 and secondary focusing lens. For example, LED 4 may have a maximum height g which in one embodiment may be 6.8 millimeters while the LED is centered at 6 millimeters. These heights may be varied as desired.

Recess 34 depicted in FIG. 1 as being beneath LED 4 may contain power leads that couple to LED 4 and are not shown.

Specific dimensions associated with one embodiment are provided as follows: j—9 millimeters, k—13 millimeters, l—4.5 millimeters, m—10 millimeters and n—13 millimeters.

The secondary focusing lens 8 may have the following specific dimensions in one embodiment. It may an overall height o of 17.8 millimeters, a diameter b as discussed, a cylindrical portion having a height d, as previously discussed as well, and a frustum section 16, having an interior cylindrical recess with a height p. Height p is selected such that the primary focusing lens sticks may be received within recess 10, while providing an inner hole or gap A between the hemispherical portion of primary focusing lens 6 and a curved surface 12. The inter-diameter q of recess 10 is selected, such that primary focusing lens 6 may be easily received within the recess without necessarily having direct contact between primary focusing lens 6 and secondary focusing lens 8. Direct contact between the primary and secondary focusing lens may be undesirable.

Figure 4:
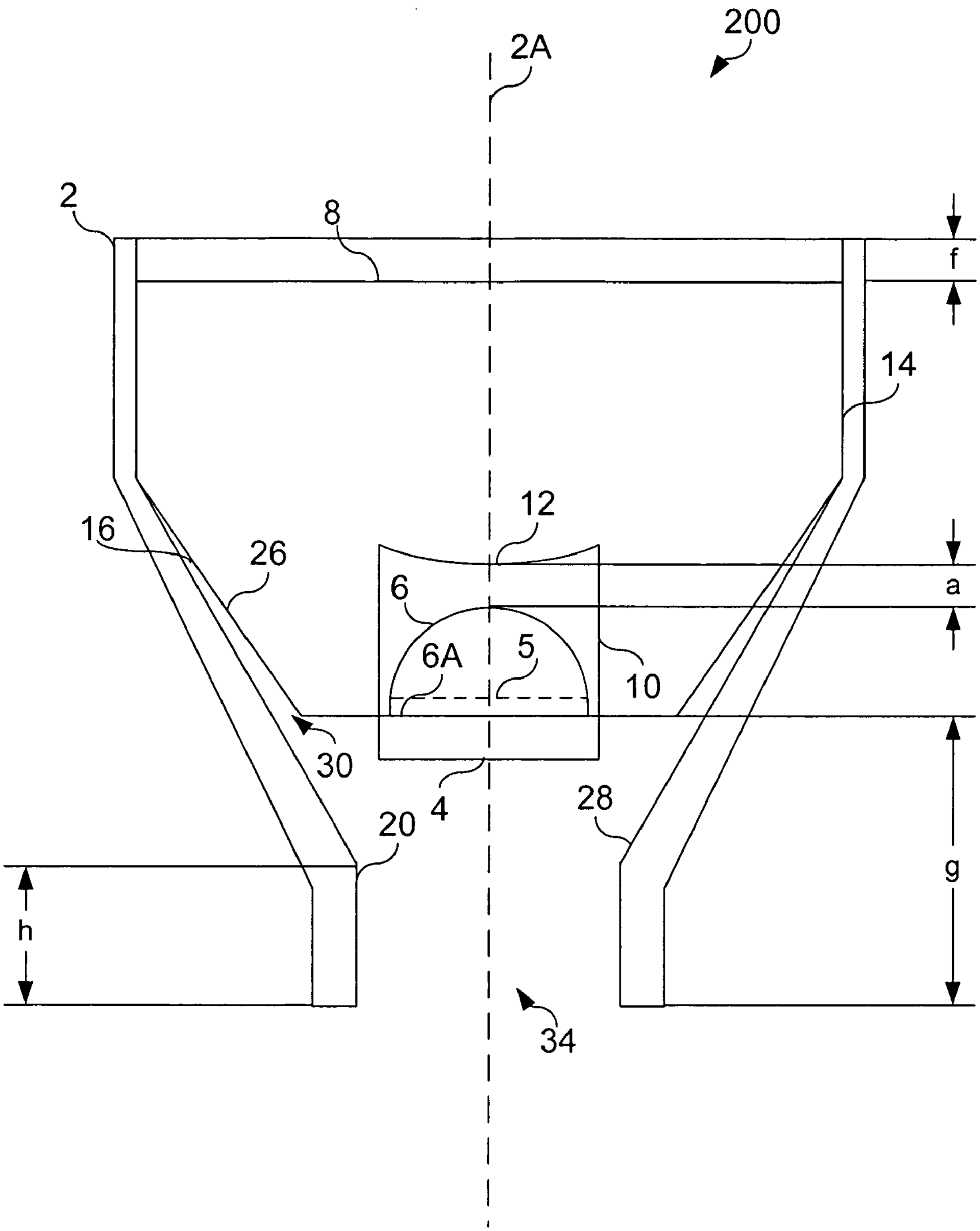
FIG. 4 shows a cross-section of a portable light source in accordance with another embodiment of the present invention.
Figure 5:
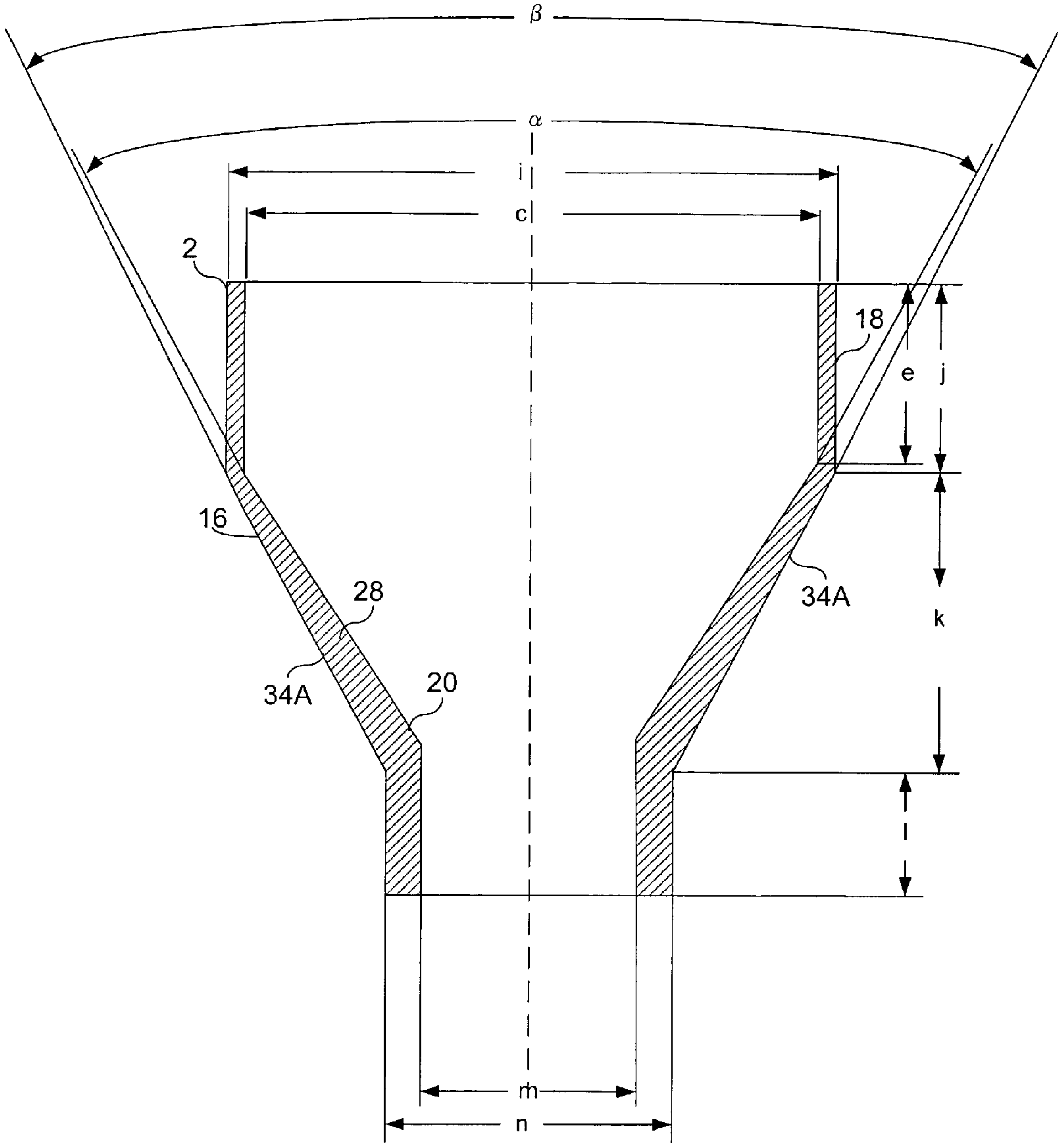
FIG. 5 provides an enlarged representation of the housing of FIG. 4.

FIG. 4 provides a cross section of a second embodiment 200 of the present invention. Parts having the same reference numerals may have the same functions as previously described in FIGS. 1 through 3. The second embodiment will show different varying length and dimensions when compared to that of the embodiment depicted in FIGS. 1 through 3. In this embodiment, the opening subtended by the housing inner walls α and outer walls β is increased when compared to that of the embodiment in FIGS. 1 through 3. This larger angle also results in a larger air gap 30 between housing 2 and secondary focusing lens 8.

Particular dimensions associated with this embodiment are that the length f is 1.4 millimeters, a=2.3 millimeters, g=7.3 millimeters, h=6 millimeters, the angles subtended are β 64 degrees and α of 60 degrees, length i is 28.4 millimeters, c is 26.1 millimeters, e=7.7 millimeters, j=9 millimeters, k=13 millimeters, l=4.5 millimeters, m=10 millimeters, and n=13 millimeters.

LED 4 may be between 0.5 and 5 watts, with one embodiment between about 2 and 4 watts. This will result in a maximum temperature of about 55° Celsius or, at least, a temperature less than 60° Celsius.

The embodiments of the portable light source, as shown in FIGS. 1 through 5, are based on the particular dimensions. However, these dimensions may be modified by the user without changing the intention of the present invention. This will be understood by those having skill in the art.

The embodiments depicted in FIGS. 1 through 5 are operable to produce a cone of light at a distance of about 30 centimeters from secondary focusing lens 8. This cone of light will be along optical axis 2A, and have a diameter of about 3 centimeters to about 8 centimeters, with an intensity of up to about 30,000 Lus. Another embodiment having a different diameter secondary focusing lens, (i.e. about 30 mm) may produce a cone of light ranging between about 3 centimeters and 8 centimeters at a distance of 30 centimeters from the secondary focusing lens with an intensity of about 50,000 Lux.

In summary, the present invention provides a portable light source that may be used to illuminate a medical or precision mechanical working area. The light source has a casing or housing, an LED, a primary focusing lens and a secondary focusing lens. The LED primary focusing lens and secondary focusing lens are arranged within the casing and aligned along a common optical axis. The common optical axis is along the direction of the light emitted from the LED. The primary focusing lens optically couples to the LED and is received within a cylindrical recess of the secondary focusing lens. The secondary focusing lens has an optically curved surface facing the primary focusing lens that has a larger radius of curvature than that of the primary focusing lens.

This portable light source, by utilizing an LED, is able to more efficiently produce light and decrease the unnecessary production of thermal energy. This results in a portable light source having an extended life while using the same power supply. Additionally, the combination of the primary focusing lens and secondary focusing lens are able to illuminate a precision working area or medical treatment field with a light having an intensity greater than 10,000 Lux. The primary and secondary focusing lenses are also able to focus the emitted light into a narrower cone at a distance from the secondary focusing lens. This results in more intense illumination of the precision work area or medical treatment field from a more efficient, light weight, and more user friendly light source.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A portable light source operable to illuminate a precision working area, comprising:

a casing having a primary focusing lens and a secondary focusing lens set into the casing; and a light emitting diode (LED) located within a recess in the casing having a curved surface, wherein the LED is operable to emit light along an optical axis, wherein the primary focusing lens and secondary focusing lens are located along the axis and operable to focus the light emitted by the LED, wherein the curved surface curves towards the primary focusing lens, wherein a predetermined distance (a) of about 1 to 3 mm along the optical axis separates the curved surface of the primary focusing lens from the curved surface of the recess, and wherein the LED has a power output of about 2 to 4 W.

2. The portable light source of claim 1, wherein a radius of curvature of the curved surface is at least twice the radius of curvature of a curved surface of the primary focusing lens that faces the curved surface of the recess.

3. The portable light source of claim 1, wherein a curved surface of the primary focusing lens that faces the curved surface of the recess is positioned at least partly within the recess.

4. The portable light source of claim 1, wherein distance (a) is about 1.8 to 2.3 mm.

5. The portable light source of claim 1, wherein the casing further comprises a conical interior oriented towards the secondary focusing lens and having a sectional angle (α) between about 40° and 80°.

6. The portable light source of claim 1, wherein the casing further comprises a conical interior oriented towards the secondary focusing lens and having a sectional angle (α) between about 50° and 70°.

7. The portable light source of claim 1, wherein the casing further comprises a conical interior oriented towards the secondary focusing lens and having a sectional angle (α) between about 58° and 64°.

8. The portable light source of claim 1, further comprising an air gap between an interior wall of the casing and the secondary focusing lens that gradually reduces along the optical axis of the LED.

9. The portable light source of claim 1, further comprising a portable power supply operably coupled to the LED.

10. A portable light source operable to illuminate a precision working area, comprising:

a casing having a primary focusing lens and a secondary focusing lens set into the casing; and a light emitting diode (LED) located within a recess in the casing having a curved surface, and wherein the LED is operable to emit light along an optical axis and wherein the primary focusing lens and secondary focusing lens are located along the axis and operable to focus the light emitted by the LED, wherein the curved surface curves towards the primary focusing lens, wherein a radius of curvature of the curved surface is at least twice the radius of curvature of a curved surface of the primary focusing lens that faces the curved surface of the recess, wherein the curved surface of the primary focusing lens that faces the curved surface of the recess is positioned at least partly within the recess, wherein a predetermined distance (a) of about 1 to 3 mm along the optical axis separates the curved surface of the primary focusing lens from the curved surface of the recess, and wherein the LED has a power output of about 2 to 4 W.

11. The portable light source of claim 10, wherein a predetermined distance (a) along the optical axis separates the curved surface of the primary focusing lens from the curved surface of the recess, and wherein the predetermined distance (a) is either about 1 to 3 mm, or about 1.8 to 2.3 mm.

12. The portable light source of claim 10, wherein the casing further comprises a conical interior oriented towards the secondary focusing lens and having a sectional angle (α) between about 40° and 80°, about 50° and 70°, or about 58° and 64°.

13. The portable light source of claim 12, further comprising an air gap between an interior wall of the casing and the secondary focusing lens that gradually reduces along the optical axis of the LED.

14. The portable light source of claim 13, further comprising a portable power supply operably coupled to the LED.

15. A portable light source operable to illuminate a precision working area, comprising:

a casing having a primary focusing lens, a secondary focusing lens set into the casing, and a conical interior oriented toward the secondary focusing lens and having a sectional angle (α) between about 40° and 80°, about 50° and 70°, or about 58° and 64°, wherein an air gap exists between an interior wall of the casing and the secondary focusing lens; and a light emitting diode (LED) located within a recess in the casing having a curved surface, and wherein the LED is operable to emit light along an optical axis and wherein:

the primary focusing lens and secondary focusing lens are located along the axis and operable to focus the light emitted by the LED;

the curved surface curves towards the primary focusing lens, wherein a radius of curvature of the curved surface is at least twice the radius of curvature of a curved surface of the primary focusing lens that faces the curved surface of the recess;

the curved surface of the primary focusing lens that faces the curved surface of the recess is positioned at least partly within the recess;

a predetermined distance (a) of about 1 to 3 mm along the optical axis separates the curved surface of the primary focusing lens from the curved surface of the recess; and the LED has a power output of about 2 to 4 W.

16. A portable light source operable to illuminate a precision working area, comprising:

a casing having a primary focusing lens, a secondary focusing lens set into the casing, and a cylindrical interior end portion of a given diameter and axial length contiguous with a conical interior wall oriented toward the secondary focusing lens and having a sectional angle (α) between about 40° and 80°, wherein the secondary focusing lens includes a cylindrical end section with a diameter that matches the given diameter of the casing and extends over at least a major portion of the axial length of the cylindrical end portion of the casing, and wherein an air gap exists between the interior wall of the casing and the secondary focusing lens; and a light emitting diode (LED) located within a recess in the casing having a curved surface, wherein the LED is operable to emit light along an optical axis and wherein:

the primary focusing lens and secondary focusing lens are located along the axis and operable to focus the light emitted by the LED;

the curved surface curves towards the primary focusing lens, wherein a radius of curvature of the curved surface is at least twice the radius of curvature of a curved surface of the primary focusing lens that faces the curved surface of the recess;

the curved surface of the primary focusing lens that faces the curved surface of the recess is positioned at least partly within the recess; and a predetermined distance of about 1 to 3 mm along the optical axis separates the curved surface of the primary focusing lens from the curved surface of the recess.

* * * * *